US011910001B2

(12) United States Patent
Mangan (10) Patent No.: US 11,910,001 B2
(45) Date of Patent: Feb. 20, 2024

(54) REAL-TIME IMAGE GENERATION IN MOVING SCENES (71) Applicant: VOYAGE81 LTD., Tel Aviv (IL)

(72) Inventor: Shmuel Mangan, Nes Ziona (IL)

(73) Assignee: VOYAGE81 LTD. (IL)

( * ) Notice: Subject to any disclaimer, the term of this patent is extended or adjusted under 35 U.S.C. 154(b) by 224 days.

(21) Appl. No.: 17/625,452

(22) PCT Filed: Jul. 9, 2020

(86) PCT No.: PCT/IL2020/050773
§ 371 (c)(1),
(2) Date: Jan. 7, 2022

(87) PCT Pub. No.: WO2021/005608
PCT Pub. Date: Jan. 14, 2021

(65) Prior Publication Data
US 2022/0256183 A1 Aug. 11, 2022

Related U.S. Application Data (60) Provisional application No. 62/871,941, filed on Jul. 9, 2019.

(51) Int. Cl.
*H04N 19/513* (2014.01)
*H04N 19/527* (2014.01)
(Continued)

(52) U.S. Cl.
CPC ......... *H04N 19/513* (2014.11); *H04N 7/0127* (2013.01); *H04N 7/0137* (2013.01);
(Continued)

(58) Field of Classification Search
CPC .................................................... H04N 19/513
(Continued)

(56) References Cited

U.S. PATENT DOCUMENTS 7,728,909 B2   6/2010   Poon
8,094,717 B2   1/2012   Imagawa et al.
(Continued)

OTHER PUBLICATIONS

Delbracio M, et al, "Hand-held video deblurring via efficient fourier aggregation"; IEEE Transactions on Computational Imaging. 1(4):270-83, Nov. 17, 2015. Online at: <https://arxiv.org/pdf/1509.05251.pdf>.
(Continued)

*Primary Examiner* — Yulin Sun
(74) *Attorney, Agent, or Firm* — The Roy Gross Law Firm, LLC; Roy Gross (57) ABSTRACT A method comprising: receiving a high frame rate video stream of a scene, wherein the scene comprises at least one object in motion relative to an imaging device acquiring the video stream; continuously dividing, in real time, the video stream into at least one consecutive sequences of n frames each; with respect to each current sequence: (i) estimating pixel motion between at least some pairs of frames in the sequence, (ii) calculating a motion vector field for each pixel in the sequence, (iii) generating a representative frame which co-locates all of the pixels to respective pixel positions, based on the calculated motion vector fields, and (iv) aggregating, for each of the respective pixel positions, pixel values from all frames in the sequence; and outputting, in real time, a stream of the representative frames, wherein the stream has a lower frame rate than the high frame rate.

20 Claims, 4 Drawing Sheets (51) Int. Cl.
*H04N 7/01* (2006.01)
*H04N 21/2343* (2011.01)
*H04N 19/587* (2014.01)
*H04N 19/597* (2014.01)

(52) U.S. Cl.
CPC ......... *H04N 19/527* (2014.11); *H04N 19/587* (2014.11); *H04N 19/597* (2014.11); *H04N 21/234381* (2013.01)

(58) Field of Classification Search
USPC .................................................. 375/240.16
See application file for complete search history.

(56) References Cited

U.S. PATENT DOCUMENTS

| | | | |
|---|---|---|---|
| 8,229,244 | B2 | 7/2012 | Agrawal et al. |
| 8,559,751 | B2 | 10/2013 | Gobert |
| 2003/0223644 | A1 | 12/2003 | Park |
| 2004/0252230 | A1* | 12/2004 | Winder .................. G06T 5/002 348/E7.071 |
| 2004/0252759 | A1* | 12/2004 | John Winder ......... H04N 19/87 375/E7.251 |
| 2009/0263044 | A1 | 10/2009 | Imagawa et al. |
| 2011/0249750 | A1 | 10/2011 | Fuchikami et al. |
| 2012/0127267 | A1 | 5/2012 | Zhang et al. |
| 2012/0218473 | A1 | 8/2012 | Xu |
| 2012/0314772 | A1* | 12/2012 | Chen ..................... H04N 19/51 375/E7.123 |
| 2014/0294320 | A1* | 10/2014 | Kokaram ............. H04N 19/597 382/300 |
| 2014/0334547 | A1 | 11/2014 | Knee |
| 2014/0363053 | A1 | 12/2014 | Robert |
| 2016/0093062 | A1 | 3/2016 | Theis |
| 2016/0125575 | A1 | 5/2016 | Takahashi |
| 2016/0301873 | A1 | 10/2016 | Molgaard |
| 2017/0064204 | A1 | 3/2017 | Sapiro |
| 2019/0057509 | A1 | 2/2019 | Lv |
| 2019/0088178 | A1 | 3/2019 | Ward |
| 2019/0138889 | A1* | 5/2019 | Jiang .................... G06N 3/045 |
| 2021/0166450 | A1 | 6/2021 | Xu |

OTHER PUBLICATIONS

PCT International Search Report for International Application No. PCT/IL2020/050773, dated Sep. 21, 2020, 7pp.

PCT Written Opinion for International Application No. PCT/IL2020/050773, dated Sep. 21, 2020, 4pp.

Eric P. Bennett et al, "Video enhancement using per-pixel virtual exposures"; ACM Transactions on Graphics; vol. 24, Issue 30, pp. 845-852, Jul. 1, 2005.

Bergen, J.R. et al, "Hierarchical model-based motion estimation"; Computer Vision—ECCV'92; Lecture Notes in Computer Science, vol. 588, May 19, 1992.

Samuel W. Hasinoff et al, "Burst photography for high dynamic range and low-light imaging on mobile cameras"; ACM Transactions on Graphics; vol. 35, Issue 6, Article No. 192, pp. 1-12, Nov. 11, 2016.

Sing Bing Kang et al, "High Dynamic Range Video"; ACM Transactions on Graphics; vol. 22, Issue 3, pp. 319-325, Jul. 1, 2003.

* cited by examiner

REAL-TIME IMAGE GENERATION IN MOVING SCENES

CROSS-REFERENCE TO RELATED APPLICATIONS

This application is a National Phase of PCT Patent Application No. PCT/IL2020/050773 having International filing date of Jul. 9, 2020, which claims the benefit of priority from U.S. Provisional Patent Application No. 62/871,941, filed Jul. 9, 2019, entitled, "SYSTEM AND METHOD FOR REAL-TIME IMAGE GENERATION IN MOVING SCENES," the contents of which are hereby incorporated by reference in their entirety.

FIELD OF INVENTION

The invention relates to the field of computer image processing.

BACKGROUND OF THE INVENTION

Digital imaging devices form an image on an electronic image sensor to create an electronic representation of a scene. A sensor typically consists of a two-dimensional array of pixels, each acting as a repository for light that is accumulated during the exposure of the sensor to the scene.

Due to the collection efficiency of an imaging device, only a small amount of light strikes a pixel, and the sensor exposure time must be long enough to gather a sufficient amount of light. An optimal exposure time must take into account, among other things, ambient lighting conditions. For example, the dimmer the scene, the longer should be the exposure time, to ensure sufficient image brightness. However, if objects in the scene are moving during capture, a longer exposure time may result in an image with object motion blur and noise. The problem becomes more significant with modern trends of image sensors having a smaller and smaller pixel area.

One method to reduce object motion blur is to shorten the exposure time. However, shorter exposure times may result in insufficient image brightness, especially in darker conditions or darker shades and other low-light sections of the image. In addition, the short exposure time cause a waste of useful photons, and a loss of dynamic range, that could have been collected and provide extended dynamic range to the image.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

In some embodiments, the present disclosure provides a system, method, and computer program product for efficient real-time computation of motion vector field through using a high frame rate camera, together with a spatial temporal calculations scheme and simplified optical flow algorithms. In an embodiment, the conditions set by the invention, specifically the fast frame rate and the spatial temporal derivatives at multiple resolutions and multiple temporal spacing, allow utilizing 100% of the photons impinging on the sensor, thus providing optimal SNR conditions for the computation. In another embodiment, the conditions set by the invention, specifically optimal SNR, the fast frame rate, and the spatial temporal derivatives at multiple resolutions and multiple temporal spacing, bring the motion detection problem to a regime where single iteration is required for solving the aperture problem and generating the motion field vectors at a pixel resolution. Accordingly, this enables computing average image frame from multiple high-rate frames under fast motion conditions, which, in an embodiment, is converted to a standard color space image or video output.

There is provided, in an embodiment, a system comprising at least one hardware processor; and a non-transitory computer-readable storage medium having stored thereon program instructions, the program instructions executable by the at least one hardware processor to: receive a high frame rate video stream of a scene, wherein the scene comprises at least one object in motion relative to an imaging device acquiring the video stream, continuously divide, in real time, the video stream into at least one consecutive sequences of n frames each, with respect to each current sequence: (i) estimate pixel motion between at least some pairs of frames in the sequence, (ii) calculate a motion vector field for each pixel in the sequence, (iii) generate a representative frame which co-locates all of the pixels to respective pixel positions, based on the calculated motion vector fields, and (iv) aggregate, for each of the respective pixel positions, pixel values from all frames in the sequence, and output, in real time, a stream of the representative frames, wherein the stream has a lower frame rate than the high frame rate.

There is also provided, in an embodiment, a method comprising: receiving a high frame rate video stream of a scene, wherein the scene comprises at least one object in motion relative to an imaging device acquiring the video stream; continuously dividing, in real time, the video stream into at least one consecutive sequences of n frames each; with respect to each current sequence: (i) estimating pixel motion between at least some pairs of frames in the sequence, (ii) calculating a motion vector field for each pixel in the sequence, (iii) generating a representative frame which co-locates all of the pixels to respective pixel positions, based on the calculated motion vector fields, and (iv) aggregating, for each of the respective pixel positions, pixel values from all frames in the sequence; and outputting, in real time, a stream of the representative frames, wherein the stream has a lower frame rate than the high frame rate.

There is further provided, in an embodiment, a computer program product comprising a non-transitory computer-readable storage medium having program code embodied therewith, the program code executable by at least one hardware processor to: receive a high frame rate video stream of a scene, wherein the scene comprises at least one object in motion relative to an imaging device acquiring the video stream; continuously divide, in real time, the video stream into at least one consecutive sequences of n frames each; with respect to each current sequence: (i) estimate pixel motion between at least some pairs of frames in the sequence, (ii) calculate a motion vector field for each pixel in the sequence, (iii) generate a representative frame which co-locates all of the pixels to respective pixel positions, based on the calculated motion vector fields, and (iv) aggregate, for each of the respective pixel positions, pixel values from all frames in the sequence; and output, in real time, a stream of the representative frames, wherein the stream has a lower frame rate than the high frame rate.

In some embodiments, at least some of the pairs of frames are adjacent pairs of frames.

In some embodiments, at least some of the pairs of frames are non-adjacent pairs of frames.

In some embodiments, the estimating is only performed with respect to a subset of the pairs in the sequence.

In some embodiments, the estimating is initialized with at least one of: an estimating associated with a preceding one of the pairs in the sequence; an estimating associated with a preceding time point in the video stream; and a hierarchical motion estimation.

In some embodiments, the estimating is performed using an optical flow system.

In some embodiments, the estimating is based, at least in part, on down-sampling resolution level.

In some embodiments, the calculating is further refined over (i) a subset of the frames in the sequence, and (ii) a subset of resolution levels, by jointly solving multi-frame multi-level temporal-spatial smoothness constraints with respect to the motion vector field.

in some embodiments, the high frame rate is between 120-10,000 frames per second (fps).

In some embodiments, n is determined based, at least in part, on a ratio between the high frame rate and the lower frame rate.

In some embodiments, the lower frame rate is determined based on a desired frame rate of the output stream.

In some embodiments, n is further determined based, at least in part, on a processing time associated with the estimating, calculating, generating and aggregating.

In some embodiments, the outputting further comprises (i) generating an image from each of the representative frames in RGB color space, and (ii) outputting the image.

In some embodiments, for each of the respective pixel positions, the aggregating is performed using pixel averaging.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Described herein are a system, method, and computer program product for automated real-time generating of images with reduced motion blur, high dynamic range and high signal-to noise ratio (SNR) of a motion scene using a high frame rate imaging device.

In some embodiments, the present disclosure is particularly useful for generating lower-noise images of a scene from a sequence of frames, e.g., a video stream, acquired by a high frame rate imaging device in low light conditions and/or when objects in the scene are in motion.

Motion blur and signal noise are primary sources of image quality degradation in digital imaging. In low light conditions, the image quality is often a tradeoff between motion blur and noise. Long exposure time is required in low illumination level in order to obtain adequate signal to noise ratio. On the other hand, risk of motion blur due to camera-induced motion or subject motion increases as exposure time becomes longer.

Motion blur occurs when the camera or the subject moves during the exposure period. When this happens, the image of the subject moves to different area of the camera sensor photosensitive surface during the exposure time. Thus, when the exposure time is long, camera movements or the movement of an object in the scene are likely to become visible in the image.

Digital camera noise includes multiple noise sources, e.g., noise created by photosensor components; noise generated by photosensor voltage leaks; pattern noise associated with the nonuniformity of the image sensor pixels; or the dominant noise source—photon shot noise—which is associated with the randomness of the number of captured photons by a sensor pixel during a given time interval. Due to the Poisson distribution of the shot noise, the relative noise decrease as the amount of light increases, therefore longer exposure time improves the SNR.

This is particularly the case in the mobile device cameras, such as smartphone cameras. Because of their smaller size, pixels receive a smaller number of photons within the same exposure time. In addition, the random noise caused by various sources is present in the obtained signal.

The most effective way to reduce the relative amount of noise in the image (i.e., increase the SNR) is to use longer exposure times, which allows more photons to be observed by the sensor. However, in the case of long exposure times, the risk of motion blur increases.

Known methods which attempt to mitigate these issues include:

Applying convolution kernels to increase image resolution, however these techniques provide only limited improvement, usually when the motion extent is small and global.

Using optical or electronic image stabilization to mitigate small-extent camera motion and vibrations. However, while useful for compensating camera shake, these techniques are ineffective when the motion extent is large or motion is not global.

Grabbing multiple frames with selection of frames based on sharpness criteria. However, this method fails to deal with non-uniform motion in the scene.

However, these known methods typically cannot effectively handle low light conditions, concurrent camera motion and objects motion, and/or large frame-to-frame motion rate.

Accordingly, in some embodiments, the present disclosure provides for a process which captures a sequence of high-frame-rate, short-exposure-time image frames of a scene, e.g., using a high frame rate imaging device.

In some embodiments, the present disclosure then calculates pixel-level motion between pairs of adjacent frames within the sequence of frames.

In some embodiments, the present disclosure then calculates a motion vector field for each pixel across all frames in the sequence.

In some embodiments, the present disclosure then provides for calculating aggregate pixel values for each pixel position across all frames in the sequence where the aggregation compensates the motion between pixels of different frames. In some embodiments, aggregate pixel values may then be used for generating a representative image of all frames in the sequence, in which each pixel position reflects an increased amount of captured photons, and thus higher SNR, as compared to any individual frame in the sequence. In some embodiments, aggregating or combining pixel values across multiple short-exposure frames works to increase an effective exposure time for the resulting representative image, without incurring any motion blur penalty.

In some embodiments, this process may be performed iteratively, e.g., on consecutive sequences from a continuous video stream. In some embodiments, with respect to each such sequence, the present disclosure provides for outputting a representative frame in which each pixel position reflects an increased amount of captured photons, and thus higher SNR, as compared to any individual frame in the sequence. In some embodiments, the present disclosure provides for outputting a corresponding stream of representative frames at a frame rate that is lower than the higher acquisition frame rate of the stream, e.g., an output rate of 10-100 fps. In some embodiments, an output stream frame rate of the present disclosure may be determined based on a desired output frame rate, e.g., in conjunction with the requirement of a downstream application or implementation.

In some embodiments, the generated representative image and/or stream of images may then be converted, e.g., to a standard RGB color space and outputted as a standard RGB image.

In some embodiments, the present disclosure provides for performing this process in real time, e.g., by generating in real time a continuous lower-frame-rate stream of high SNR images free of motion blur, from a received high-frame-rate image stream, e.g., a video stream. In some embodiments, continuous real time representative image generation may be enabled because the present process provides for reduced computational overhead requirements, by utilizing a high-frame-rate input stream which represents relatively small frame-to-frame motion rates. Thus, motion estimation can be calculated quickly and efficiently on commonly used imaging platforms, e.g., mobile devices, without the need for offline processing.

In some embodiments, the present disclosure is based on aggregating a representative image frame exposure time from multiple high-frame-rate, short-exposure-time frames, which may provide for a greater dynamic range of illumination, because in strong light, this prevents saturation due to the limited full-well capacity of the image sensor, and enables 100% photons collection during the full imaging time, thus improving SNR and motion detection accuracy. In low-light condition, this prevents saturation by strong light sources in the scene, and uses them as strong motion anchors while enabling 100% photon collection of darker areas in the scene.

In some embodiments, the present disclosure may be particularly suited for implementing using commonly available technologies and devices, such as:

Low cost, high speed CMOS image sensors,
high frame rate image sensors which can operate at rates of, e.g., between 120-10,000 frames per second (fps),
mobile devices such as smartphones which package, incorporating image sensors, memory, and suitable processing capabilities within a small unit with low power consumption, and/or
efficient, highly parallel processing modules using small processing units, such as graphics processing units (GPU), tensor processing units (TPU), and artificial intelligence processing units (AIU), or other arrays of multiply accumulate (MAC) operations which can be incorporated within a smart-camera or mobile device.

A potential advantage of the present disclosure is, therefore, in that it provides for efficient real-time computation of a motion vector field in a sequence of high frame rate image or video stream, which allows aggregating the total amount of photons impinging on each pixel position in the image sensor, to produce a continuous stream of motion-compensated, high dynamic range, high-SNR representative standard color space images as an output.

By using higher frame rate image acquisition, for a given scenario with a desired frame rate output, the present disclosure increases the ability to operate in a wide dynamic range of illuminations conditions. In strong light, this prevents saturation due to the limited full-well capacity of the image sensor, and enables 100% photon collection during the full imaging time, thus improving SNR and motion detection accuracy. In low-light condition, this prevents saturation by strong light sources in the scene, and uses them as strong motion anchors while enabling 100% photon collection of darker areas in the scene.

The present disclosure may be particularly useful in the context of, e.g., consumer grade cameras, e.g., in mobile devices, which typically exhibit poor results when filming scenes in motion under low light.

As used herein, the term 'image' refers to a two-dimensional array of pixel values. An image can be a two-dimensional subset of another image. A digital image includes one or more digital image channels, each comprises a two-dimensional array of pixels, wherein each pixel value relates to the amount of light received by an electronic image sensor corresponding to the geometrical domain of the pixel. For color imaging applications, a digital image will typically consist of red, green, and blue digital image channels, however, other configurations are also practiced. For monochrome applications, the digital image consists of one digital image channel. In some embodiments, the present disclosure can be applied to, but is not limited to, a digital image for any of the above-mentioned applications.

Although the present disclosure describes a digital image channel as a two-dimensional array of pixel values arranged by rows and columns, the present disclosure can be applied to mosaic arrays, such as Bayer array, with equal effect. Similarly, the present disclosure can be applied to color image sensors where pixel color sensors are laid one on top of the other.

In some embodiments, the present disclosure describes replacing an original pixel value with processed pixel values, to form a new digital image with the processed pixel values, however, retaining original pixel values is also contemplated.

Figure 1:
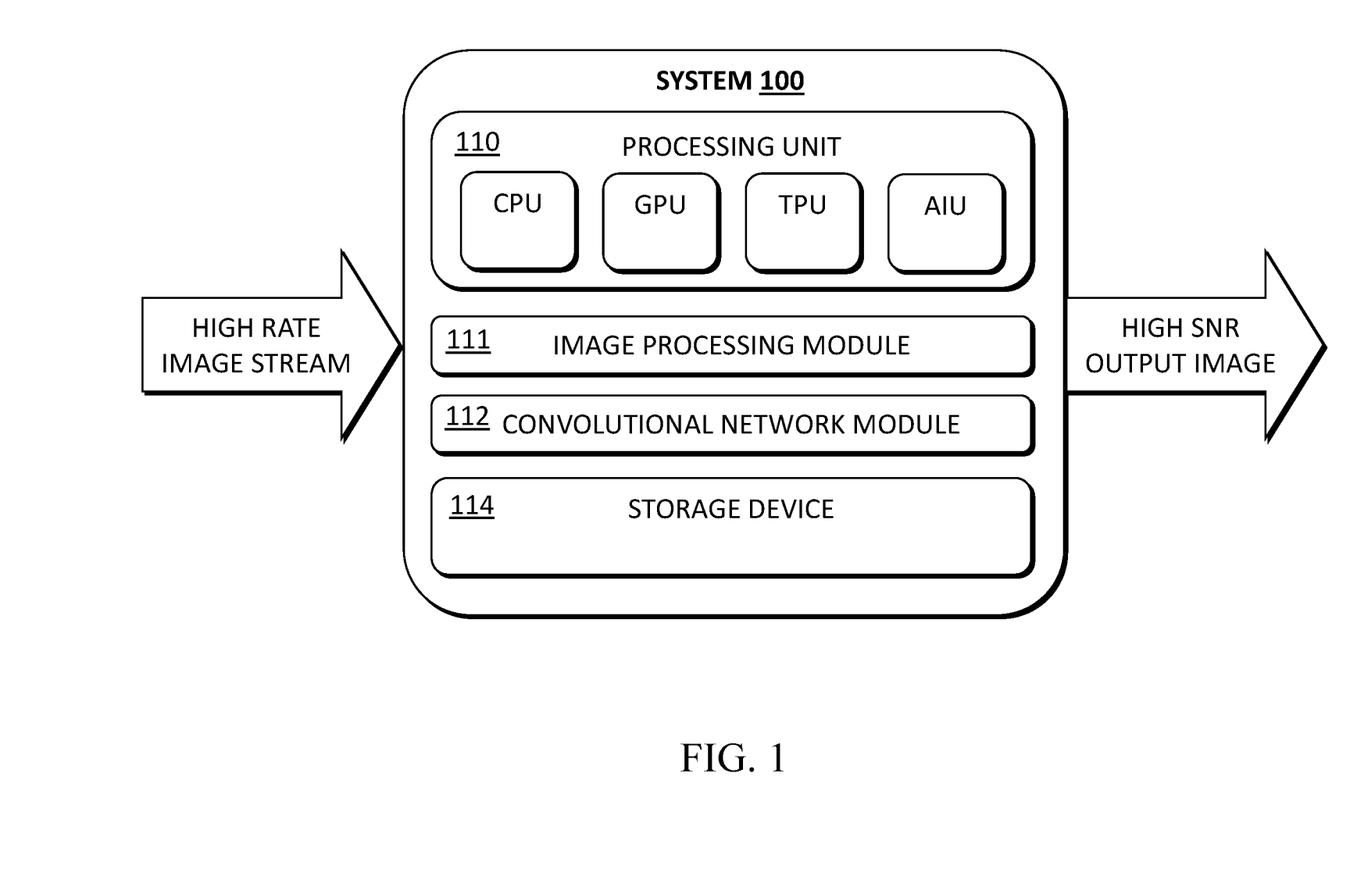
FIG. 1 shows an exemplary system for automated real-time generating of images with reduced motion blur and high signal-to noise ratio (SNR) in a motion scene using a high frame rate imaging device, according to exemplary embodiments of the present invention.

FIG. 1 illustrates an exemplary system 100 for automated real-time generating of high SNR images of a scene, using a high frame rate imaging device, in accordance with some embodiments of the present invention.

System 100 as described herein is only an exemplary embodiment of the present invention, and in practice may have more or fewer components than shown, may combine two or more of the components, or may have a different configuration or arrangement of the components. The various components of system 100 may be implemented in hardware, software, or a combination of both hardware and software. In various embodiments, system 100 may comprise a dedicated hardware device, or may form an addition to or extension of an existing device.

In some embodiments, system 100 may comprise a processing unit 110 and memory storage device 114. In some embodiments, system 100 may store in a non-volatile memory thereof, such as storage device 114, software instructions or components configured to operate a processing unit (also "hardware processor," "CPU," or simply "processor), such as processing unit 110. In some embodiments, the software components may include an operating system, including various software components and/or drivers for controlling and managing general system tasks (e.g., memory management, storage device control, power management, etc.) and facilitating communication between various hardware and software components. In some embodiments, system 100 may comprise one or more graphic processing units (GPUs). In some embodiments, processing unit 110 comprises, e.g., a GPU, a TPU, an AIU, or other arrays of multiply accumulate (MAC), which can be incorporated within any desktop, smart camera, or mobile computing device.

In some embodiments, system 100 may further comprise one or more of, e.g., an IMU sensor used for compensating self-vibrations.

The software instructions and/or components operating processing unit 110 may include instructions for receiving and analyzing multiple frames captured by a suitable imaging device. For example, processing unit 110 may comprise image processing module 111 and convolutional network module 112. Image processing module 110 receives, e.g., a video stream and applies one or more image processing algorithms thereto.

The incoming image stream may come from various imaging devices. The image stream received by the image processing module 111 may vary in resolution, frame rate (e.g., between 100 and 10,000 fps), format, and protocol according to the characteristics and purpose of their respective source device. Depending on the embodiment, the image processing module 111 can route video streams through various processing functions, or to an output circuit that sends the processed video stream for presentation, e.g., on a display, to a recording system, across a network, or to another logical destination. The image processing module 111 may perform image stream processing algorithms alone or in combination. Image processing module 111 may also facilitate logging or recording operations with respect to an image stream.

Convolutional network module 112 may comprise a network of convolutional layers that perform motion detection or compensation through derivative convolution kernels, down- and up-sampling kernels, or low-pass kernels, or spatial shift kernels, within a single frame or between two or more frames in a sequence.

In some embodiments, system 100 may also be configured to estimate motion between image frames, i.e., determine motion vectors field that describe the transformation from every point in one frame to points in another frame (usually, between adjacent frames in a sequence or between all frames to one representative frame). Motion estimation may be defined as the process of finding corresponding points between two images (e.g., frames), wherein the points that correspond to each other in two views of a scene or object may be considered to be the same point in that scene or on that object. In some embodiments, the present disclosure may apply high density optical flow algorithm base of inter- and intra-frame derivatives plus a global constraint to estimate motion between frames. See, e.g., B. K. P. Horn and B. G. Schunck, "Determining optical flow." *Artificial Intelligence*, vol 17, pp 185-203, 1981. In some embodiments, the components and conditions set forth by the present disclosure enable solving the global constraint in a single or a few iterations, thus enabling efficient computation of the dense optical flow in real time. In some embodiments, the present disclosure may apply optical flow and/or another and/or similar computer vision technique or algorithm to estimate motion between frames. See, e.g., Farnebäck G. (2003) Two-Frame Motion Estimation Based on Polynomial Expansion. In: Bigun J., Gustavsson T. (eds) Image Analysis. SCIA 2003. Lecture Notes in Computer Science, vol 2749. Springer, Berlin, Heidelberg.

For consecutive image sequences such as found in video presentations, optical flow may be defined as the velocity field which warps one image into another (usually representing minute positional changes) image. In some embodiments, an optical flow estimate comprises an estimate of a translation that describes any motion of a pixel from a position in one image to a position in a subsequent image. In some embodiments, optical flow estimation returns, with respect to each pixel and/or groups of pixels, a change is coordinates (x, y) of the pixel. In some embodiments, pixel motion between pairs of images may be estimated using additional and/or other methods. In some embodiments, system 100 may also compute cumulative pixel coordinate difference acquired over a sequence of image frames.

Figure 2:
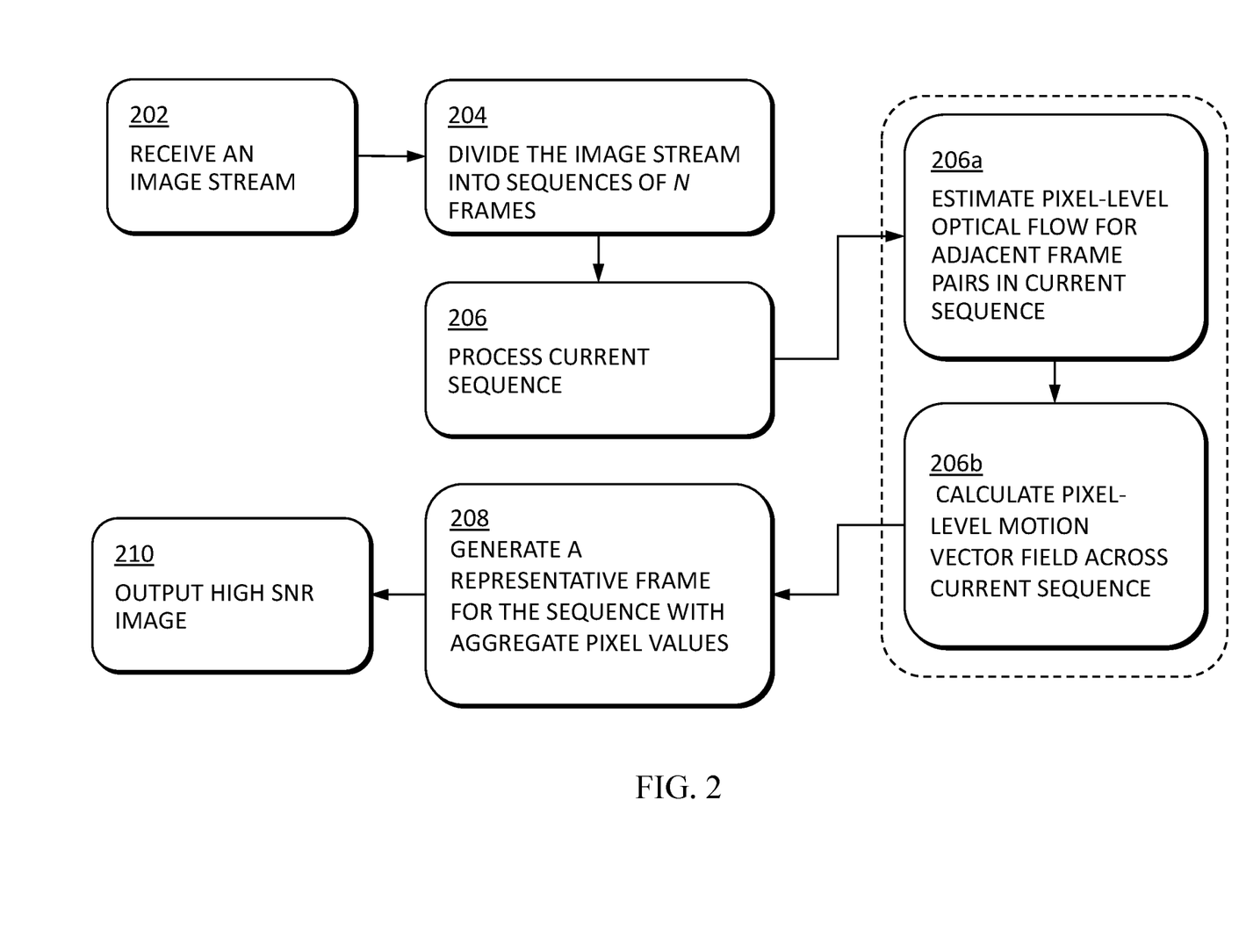
FIG. 2 is a flowchart detailing the functional steps in a process for automated real-time generating of images with reduced motion blur and high signal-to noise ratio (SNR) of a motion scene using a high frame rate imaging device, according to exemplary embodiments of the present invention.

FIG. 2 is a flowchart detailing the functional steps in a process for automated real-time generating of lower-noise, high dynamic range, motion compensated images of a scene, using a high frame rate imaging device, in accordance with some embodiments of the present invention.

In some embodiments, at step 202, a system such as exemplary system 100 in FIG. 1 may be configured to receive an input image stream depicting, e.g., a scene, which may comprise one or more moving objects, such as humans, pets, vehicles, and the like, or a relative motion between the camera and the scene.

In some embodiments, the input stream may be acquired using a high frame rate imaging device, e.g., between 120-10,000 fps. In some embodiments, an imaging device with a lower and/or higher frame rate may be used.

In some embodiments, the scene or parts of the scene depicted in the stream may be dimly lit, e.g., the image stream may be acquired under low light ambient conditions. In some embodiments, parts of the scene contain dark shaded regions. In some embodiments, the scene may comprise objects moving at a relatively high rate of motion. In some embodiments, the camera is moving at a relatively high rate of motion or angular motion relative to the scene.

In some embodiments, at step 204, the image frame stream may be continuously divided into consecutive sequences of n frames each, e.g., between 5-100 frames per sequence.

In some embodiments, the number of frames in each sequence may be determined by a combination of parameters, including, but not limited to, type and architecture of the computing platform, desired speed and quality outcomes, and the like. In some embodiments, the number of frames in a sequence may be dictated, e.g., by the computing power and processing times of the associated computing platform on which the process is to be performed. In some embodiments, the number of frames in a sequence may be dynamically adjusted, based, at least in part, on instant response times of the computing platform. Thus, for example, a first sequence may comprise a specified number of frames assuming frame processing time of, e.g., 80 ms, whereas a subsequent sequence may comprise, e.g., a larger number of frames, where instant processing times may have reduced to, e.g., 40 ms.

In some embodiments, at step 206, present disclosure estimates pixel motion throughout pairs of adjacent frames in the sequence, in a continuous optical flow process which estimates pixel motion frame-to-frame throughout the sequence. In some embodiments, at step 206, the present disclosure uses multiple down-sampled levels of a pair of frames to estimate pixel motion throughout pairs of adjacent frames.

In some embodiments, at step 206, present disclosure estimates pixel motion throughout a subset of multiple pairs of non-adjacent frames in the sequence, in a continuous optical flow process which estimates pixel motion through the sequence.

In some embodiments, the estimated frame-to-frame pixel motion calculated at step 206 is jointly refined over a subset of frames and a subset of resolution levels using multi-frame temporal-spatial constraints over the motion vector field.

Figure 3A:
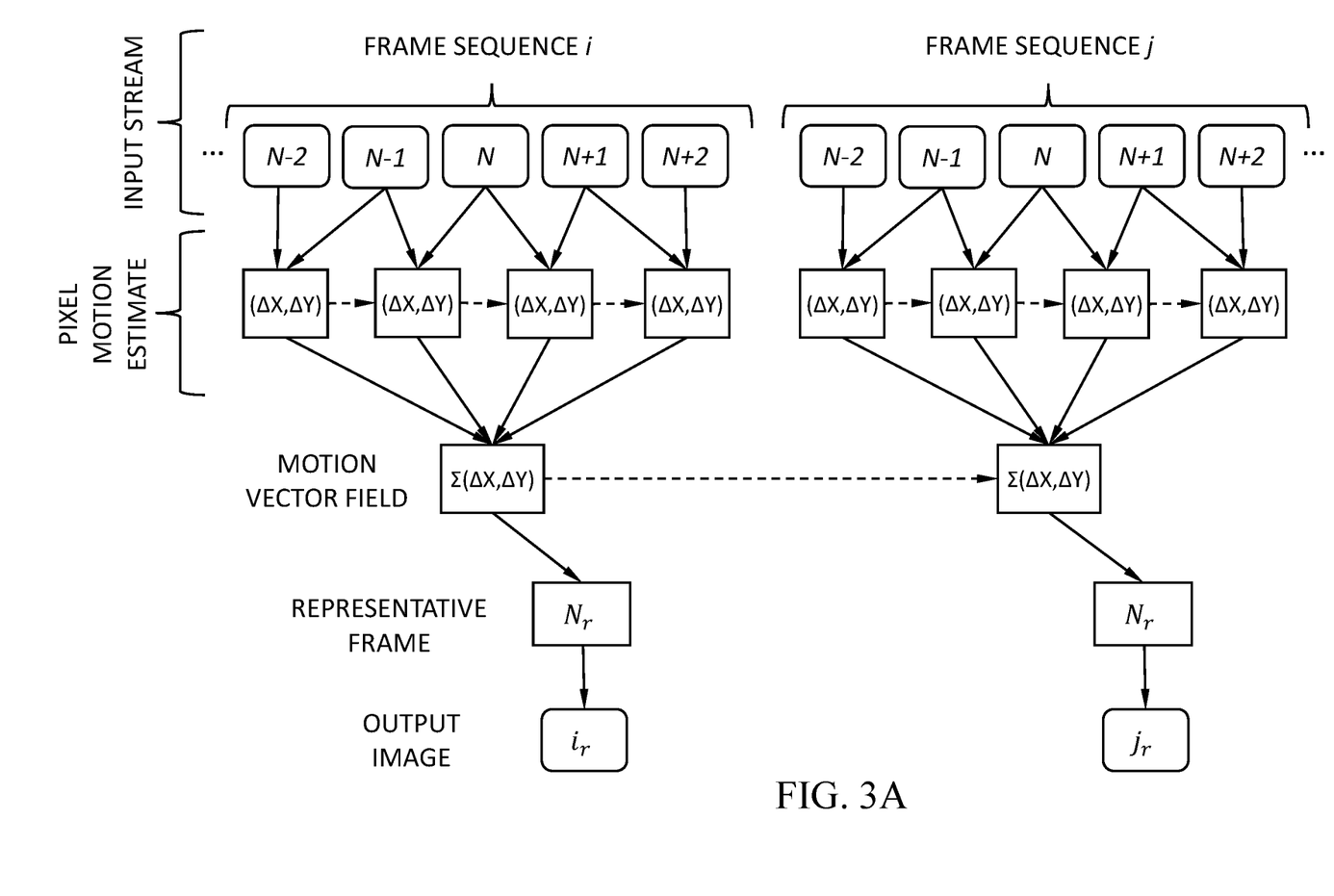
FIGS. 3A-3B are schematic illustrations of an iterative process for automated real-time generating of images with reduced motion blur and high signal-to noise ratio (SNR) of a motion scene using a high frame rate imaging device, according to exemplary embodiments of the present invention.

FIG. 3A is a schematic illustration of the iterative process of step 206. Accordingly, as illustrated in FIG. 3A, in some embodiments, system 100 may receive a current sequence comprising n frames, e.g., sequence i comprising frames N−2 through N+2, where n=5 in the number of frames in the sequence.

System 100 may then perform the following sub-steps of step 206 with respect to each current sequence:
  (i) Step 206a: Estimate pixel-level motion e.g., between:
    a. frames [N−2]–[N−1],
    b. frames [N−1]–[N],
    c. frames [N]–[N+1], and
    d. frames [N+1]–[N+2]; and
  (ii) Step 206b: Calculate pixel-level motion field vector for each pixel over current sequence using the motion estimated over all resolution levels and frame pairs.

In some embodiments, pixel-level motion estimation may be refined over multiple down-sampled resolution levels, between each adjacent pair of frames in current sequence i.

In some embodiments, adjacent pair motion estimation may be initialized using a result from another, e.g., preceding, pair in the sequence.

In some embodiments, pixel-level motion estimation according to the present disclosure may be performed using any suitable method, e.g., any suitable image motion estimation algorithms, such as any optical flow or 2D motion flow algorithm.

Optical flow is the pattern of apparent motion of objects, surfaces, and edges in a visual scene caused by the relative motion between an observer and a scene. Optical flow can also be defined as the distribution of apparent velocities of movement of brightness pattern in an image.

Thus, the optical flow methods try to calculate the motion between two image frames which are taken at times t and t+Δt at every pixel or voxel position. These methods are called differential, because they are based on local Taylor series approximations of the image signal; that is, they use partial derivatives with respect to the spatial and temporal coordinates.

For a 2D+t dimensional case, a voxel at location (x, y, t) with intensity I(x, y, t) will have moved by Δx, Δy and Δt between the two image frames, and the following brightness constancy constraint can be given:

$$I(x,y,t) = I(x+\Delta x, y+\Delta y, t+\Delta t)$$

Assuming the movement to be small, the image constraint at I(x, y, t) with Taylor series can be developed to get:

$$I(x+\Delta x, y+\Delta y, t+\Delta t) = I(x, y, t) + \frac{\partial I}{\partial x}\Delta x + \frac{\partial I}{\partial y}\Delta y + \frac{\partial I}{\partial t}\Delta t + H.O.T.$$

From these equations it follows that:

$$\frac{\partial I}{\partial x}\Delta x + \frac{\partial I}{\partial y}\Delta y + \frac{\partial I}{\partial t}\Delta t = 0 \text{ or}$$

$$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0$$

which results in $$\frac{\partial I}{\partial x}V_x + \frac{\partial I}{\partial y}V_y + \frac{\partial I}{\partial t} = 0$$

where $V_x$, $V_y$ are the x and y components of the velocity or optical flow of I(x, y, t) and $$\frac{\partial I}{\partial x}, \frac{\partial I}{\partial y}, \text{ and } \frac{\partial I}{\partial t}$$

are the derivatives of the image at (x, y, t) in the corresponding directions. $I_x$, $I_y$ and $I_t$ can be written for the derivatives in the following:

$$I_x V_x + I_y V_y = -I_t$$

or $$\nabla I^T \cdot \vec{V} = -I_t.$$

The above detailed method describes computing the spatial and temporal derivatives of every pixel in the image $I_x$, $I_y$, $I_t$. However, computing the motion vector field for every pixel requires solving the 'aperture problem' of motion estimation. Known methods for solving the aperture problem include:
  Phase correlation;
  Block-based methods (minimizing the sum of squared differences or sum of absolute differences, or maximizing normalized cross-correlation);
  Differential methods of estimating optical flow, based on partial derivatives of the image signal and/or the sought flow field and higher-order partial derivatives, such as:

Lucas-Kanade method: Regarding image patches and an affine model for the flow field, Horn-Schunck method: Optimizing a functional based on residuals from the brightness constancy constraint, and a particular regularization term expressing the expected smoothness of the flow field, Buxton-Buxton method: Based on a model of the motion of edges in image sequences, Black-Jepson method: Coarse optical flow via correlation, and General variational methods: A range of modifications/extensions of Horn-Schunck, using other data terms and other smoothness terms.

Discrete optimization methods: The search space is quantized, and then image matching is addressed through label assignment at every pixel, such that the corresponding deformation minimizes the distance between the source and the target image. The optimal solution is often recovered through Max-flow min-cut theorem algorithms, linear programming or belief propagation methods.

The main draw backs of the optical flow methods are in the computation of derivatives: First, when the motion is too fast, the motion blur effect prevents accurate estimation of the derivatives, and reduces the accuracy of the method. Second, when short exposure is used to prevent motion blur, the distance due to spatial motion between frames is too long for correct estimation of the spatial derivatives. In most applications, these limit the solutions to low motion rate only.

In some embodiments, the present disclosure utilizes Horn-Schunck method of estimating optical flow, which is a global method which introduces a global constraint of smoothness to solve the aperture problem. The method is iterative by nature, however under certain conditions, such as small motion, it may be solved by one or few iterations only.

Variations of the technique may include:

Applying hierarchical down-sampling and using multi scale resolution;

using key-point matching for better estimation on corners and junctions; or feeding the motion from earlier frames as initial guess.

Accordingly, in some embodiments, the present disclosure provides for calculating a motion vector field for each pixel in each frame in a current sequence, based on computation of the spatial and temporal derivatives in each adjacent frame pair, e.g., frames N−1, N in FIG. 3A, as described above. In some embodiments, spatial derivatives may be calculated by a frame of a pair of adjacent frames in the x and y directions, and subtracting the result from the unshifted image to produce the x, y derivatives $I_x$, $I_y$. In some embodiments, the pair of frames N−1, N are subtracted to produce the temporal derivative $I_t$.

In some embodiments, the present disclosure provides for calculating a motion vector field for each pixel in each frame in a current sequence, based on computation of the spatial and temporal derivatives between a subset of non-adjacent frame pairs, e.g., frames N, M, as described above. In some embodiments, spatial derivatives may be calculated by a frame of a pair of non-adjacent frames in the x and y directions, and subtracting the result from the unshifted image to produce the x, y derivatives $I_x$, $I_y$. In some embodiments, the pair of frames N, M are subtracted to produce the temporal derivative $I_t$.

In some embodiments, the aperture problem may then be solved using a predefined input method, such as Lucas-Kanade, Horn-Schunck, or any other suitable method. In some embodiments, solving the aperture problem comprises, e.g., controlling input parameters of the process, e.g., block size, smoothness regulation term, or any other relevant parameter. In some embodiments, this process may further be initialized using a motion vector field estimate which may be taken from the result of another adjacent frame pair in the sequence.

In some embodiments, motion vector field calculation may utilize multi-scale resolution, also known as hierarchical resolution or pyramidal resolution. Accordingly, in some embodiments, frame pair N, M may be down-sampled at several ratios, such as, but not limited to, 2:1, 4:1, and up to a maximal ratio max:1, before the derivatives are calculated as described above.

In some embodiments, the calculated derivatives may be used for solving the aperture problem, to produce the output motion vector field.

Accordingly, in some embodiments, a current frame sequence, e.g., sequence i in FIG. 3A, may be processed according to the iterative process of step 206 to produce a motion vector field for each pixel position in the frames comprising sequence i.

In some embodiments, at step 208 in FIG. 2, the present disclosure may provide for generating a representative frame $n_r$ for each current sequence, e.g., sequence i in FIG. 3A. In some embodiments, representative frame $n_r$ comprises all pixels of at least some of the frames in sequence i co-located into a representative pixel position, based on average motion vector fields and occlusion state calculations performed in step 206.

In some embodiments, occlusion state is defined per pixel per frame. In some embodiments, the occlusion is detected using pixel neighborhood similarity metrics between frames. In some embodiments, the occlusion is detected by detecting voids in the motion vector field.

Accordingly, in some embodiments, the present disclosure calculates the averages motion over at least some of the frames, e.g., all frames or a subset of frames, in sequence i. In some embodiments, the present disclosure then applies motion-compensated average on the frames in sequence i, to produce an average 'frozen' image that represents an aggregate of all pixel values at each pixel position in frames in sequence i. In some embodiments, the aggregation is through averaging the pixel intensity values.

In some embodiments, step 208 comprises a global aligning, shifting, registration, and/or warping operation on at least a subset of frames in sequence i, to co-locate corresponding pixels in each frame in sequence i on a selected frame, e.g., a center frame, an intermediate frame, a middle frame, etc., within sequence i.

Figure 3B:
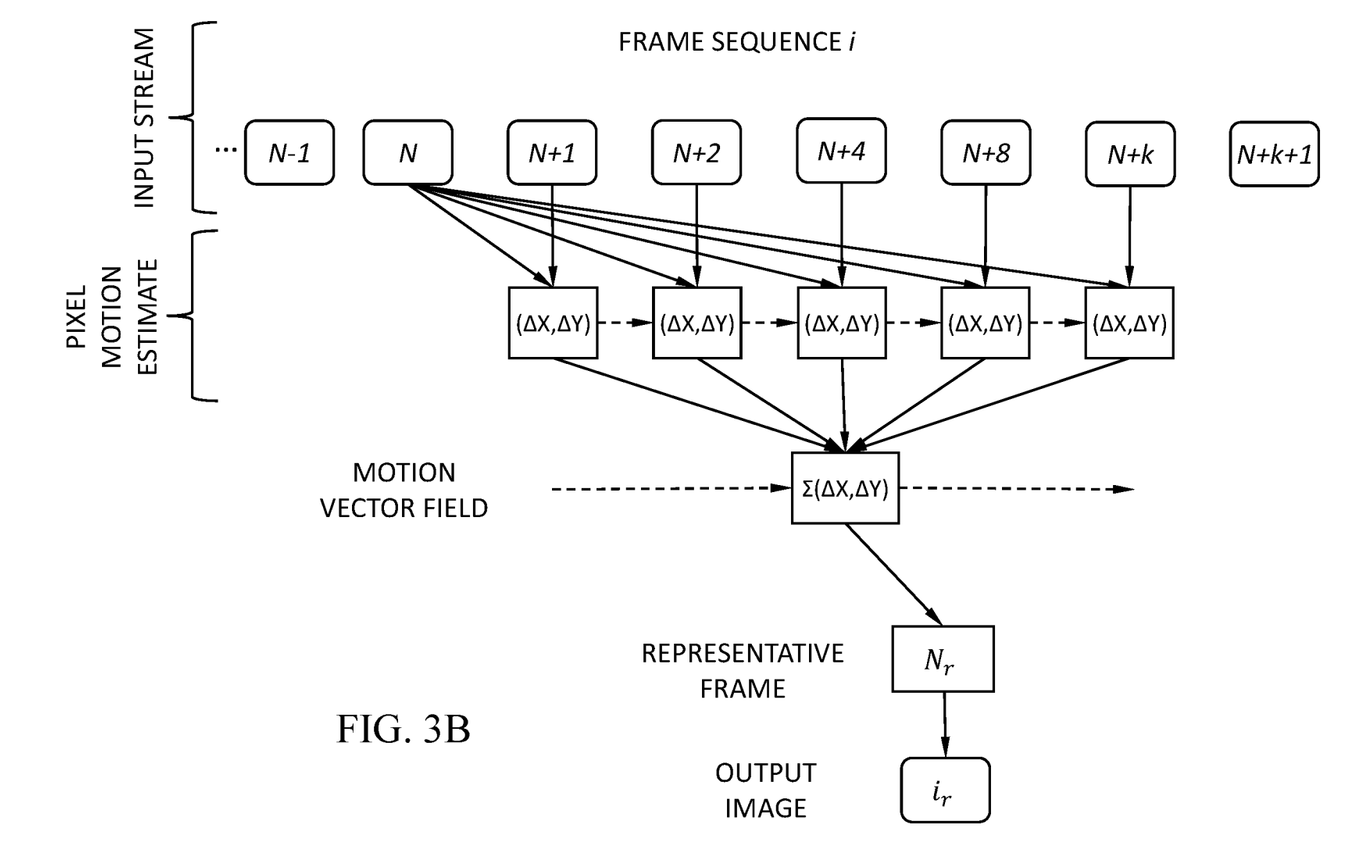

In some embodiments, steps 206 and/or 208 may be performed with respect to a sparse frame sequence, comprising, e.g., a subset of frames in sequence i, e.g., the first, second, fourth, eights frames, etc., or any other selected subset. FIG. 3B is a schematic illustration of the iterative process of step 206 performed with respect to a sparse frame sequence.

In some embodiments, with continued reference to step 208 in FIG. 2, pixel values for all co-located pixels in representative frame $n_r$ may be combined to form an image output $i_r$. Thus, the charge from same-colored pixels can be combined or binned, e.g., based on combining signal levels, a weighted average of values associated with pixel charges, and/or any other suitable method. In some embodiments, the resulting SNR of the combined pixels increases the SNR relative to the uncombined signal. In some embodiments, the resulting dynamic range of the combined pixels increases the dynamic range relative to the uncombined signal.

In other embodiments, the sensor may be a color sensor such as a Bayer, a quad-Bayer (where each Bayer pixel is split into 4 sub-pixels), a nova-Bayer (9 sub-pixel Bayer), and/or any other spatial mosaic or depth-overlaid color arrangement. In the case of color sensors, the color data may be first converted into a monochrome intensity field, which is used for producing the motion vector field, and each color is motion averages separately before being de-mosaiced for producing the color image. In another embodiment, the color data is first de-mosaiced, and each color is used for computing the spatial-temporal derivatives for the motion field computation, wherein the gradients are computed over the sub-Bayer-pixels of quad-Bayer, nova-Bayer, etc., and the spatial gradients are used for color de-mosaicking. In some embodiments, the temporal gradients are computed before de-mosaicking using single color interpolation, while in other embodiments, the temporal gradients are computed after multi-color de-mosaicking. In some embodiments, the derivatives are computed per pixel of the image sensor resolution (e.g., 40 MP), while the optical flow is estimated in a lower resolution such as the output resolution (e.g., 4K/UHD/8 MP). In some embodiments, the motion field is computed per pixel of the image sensor resolution (e.g., 40 MP), while the output is in a lower resolution (e.g., 4K/UHD/8 MP), such that the initial resolution is used for sub-resolution shifts before down-sampling to the target output resolution. The output of the algorithm is an image in a target color-space such as RGB. The image passes a color transformation from the separate fields of linear separate colors, such as R, G, B, to produce the standard displayable image in sRGB or otherwise equivalent standard color space.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
   receive a high frame rate video stream of a scene, wherein said scene comprises at least one object in motion relative to an imaging device acquiring said video stream,
   continuously divide, in real time, said video stream into consecutive sequences of n frames each,
   with respect to each current sequence:
   (i) estimate motion for each pixel between adjacent pairs of frames in said current sequence,
   (ii) calculate a motion vector field for each of said pixels in said current sequence,
   (iii) generate a representative frame which co-locates each of said pixels to a respective pixel positions, based on said calculated motion vector fields, and
   (iv) aggregate, for each of said respective pixel positions, pixel values associated with its corresponding co-located pixel from all frames in said current sequence, and
   output, in real time, a stream of said representative frames, wherein said stream has a lower frame rate than said high frame rate.

2. The system of claim 1, wherein at least some of said pairs of frames are non-adjacent pairs of frames.

3. The system of claim 1, wherein said estimating is initialized with at least one of: a said estimating associated with a preceding one of said pairs in said sequence; a said estimating associated with a preceding time point in said video stream; and a hierarchical motion estimation.

4. The system of claim 1, wherein said estimating is performed using an optical flow method.

5. The system of claim 1, wherein said calculating is further refined over (i) a subset of said frames in said sequence, and (ii) a subset of resolution levels, by jointly solving multi-frame multi-level temporal-spatial smoothness constraints with respect to said motion vector field.

6. The system of claim 1, wherein said high frame rate is between 120-10,000 frames per second (fps).

7. The system of claim 1, wherein, for each of said respective pixel positions, said aggregating is performed using pixel averaging.

8. A method comprising:
   receiving a high frame rate video stream of a scene, wherein said scene comprises at least one object in motion relative to an imaging device acquiring said video stream;
   continuously dividing, in real time, said video stream into consecutive sequences of n frames each;
   with respect to each current sequence:
   estimating motion for each pixel between adjacent pairs of frames in said current sequence,
   (ii) calculating a motion vector field for each of said pixels in said current sequence,
   (iii) generating a representative frame which co-locates each of said pixels to a respective pixel positions, based on said calculated motion vector fields, and
   (iv) aggregating, for each of said respective pixel positions, pixel values associated with its corresponding co-located pixel from all frames in said current sequence; and
   outputting, in real time, a stream of said representative frames, wherein said stream has a lower frame rate than said high frame rate.

9. The method of claim 8, wherein at least some of said pairs of frames are non-adjacent pairs of frames.

10. The method of claim 8, wherein said estimating is initialized with at least one of: a said estimating associated with a preceding one of said pairs in said sequence; a said estimating associated with a preceding time point in said video stream; and a hierarchical motion estimation.

11. The method of claim 8, wherein said estimating is performed using an optical flow method.

12. The method of claim 8, wherein said calculating is further refined over (i) a subset of said frames in said sequence, and (ii) a subset of resolution levels, by jointly solving multi-frame multi-level temporal-spatial smoothness constraints with respect to said motion vector field.

13. The method of claim 8, wherein said high frame rate is between 120-10,000 frames per second (fps).

14. The method of claim 8, wherein, for each of said respective pixel positions, said aggregating is performed using pixel averaging.

15. A computer program product comprising a non-transitory computer-readable storage medium having program code embodied therewith, the program code executable by at least one hardware processor to:

receive a high frame rate video stream of a scene, wherein said scene comprises at least one object in motion relative to an imaging device acquiring said video stream;

continuously divide, in real time, said video stream into consecutive sequences of n frames each;

with respect to each current sequence:
- (i) estimate motion for each pixel between adjacent pairs of frames in said current sequence,
- (ii) calculate a motion vector field for each of said pixels in said current sequence,
- (iii) generate a representative frame which co-locates each all of said pixels to a respective pixel positions, based on said calculated motion vector fields, and
- (iv) aggregate, for each of said respective pixel positions, pixel values associated with its corresponding co-located pixel from all frames in said sequence; and output, in real time, a stream of said representative frames, wherein said stream has a lower frame rate than said high frame rate.

16. The computer program product of claim 15, wherein at least some of said pairs of frames are non-adjacent pairs of frames.

17. The computer program product of claim 15, wherein said estimating is initialized with at least one of: a said estimating associated with a preceding one of said pairs in said sequence; a said estimating associated with a preceding time point in said video stream; and a hierarchical motion estimation.

18. The computer program product of claim 15, wherein said estimating is performed using an optical flow method.

19. The computer program product of claim 15, wherein said calculating is further refined over (i) a subset of said frames in said sequence, and (ii) a subset of resolution levels, by jointly solving multi-frame multi-level temporal-spatial smoothness constraints with respect to said motion vector field.

20. The computer program product of claim 15, wherein said high frame rate is between 120-10,000 frames per second (fps).

* * * * *